US008565109B1

(12) United States Patent
Poovendran et al.

(10) Patent No.: US 8,565,109 B1
(45) Date of Patent: Oct. 22, 2013

(54) OPTIMIZATION OF POLLING PROTOCOLS IN SENSOR NETWORKS

(75) Inventors: Radha Poovendran, Seattle, WA (US); Sidharth Nabar, Seattle, WA (US); Jeffrey Walling, Seattle, WA (US)

(73) Assignee: University of Washington through its Center of Commercialization, Seattle, WA (US)

( * ) Notice: Subject to any disclaimer, the term of this patent is extended or adjusted under 35 U.S.C. 154(b) by 314 days.

(21) Appl. No.: 13/014,543

(22) Filed: Jan. 26, 2011

Related U.S. Application Data

(60) Provisional application No. 61/299,687, filed on Jan. 29, 2010.

(51) Int. Cl.
*H04L 12/26* (2006.01)
*H04W 4/00* (2009.01)
*H04J 3/16* (2006.01)

(52) U.S. Cl.
USPC ........... 370/252; 370/231; 370/328; 370/346; 713/300; 713/320

(58) Field of Classification Search
USPC .................. 370/252–231, 328–449; 709/224; 713/300–324; 718/104–105
See application file for complete search history.

(56) References Cited

U.S. PATENT DOCUMENTS

| 5,774,669 | A * | 6/1998 | George et al. ................. 709/224 |
| 6,898,751 | B2 * | 5/2005 | Aikawa et al. ................. 714/748 |
| 6,938,103 | B2 * | 8/2005 | Azzarito et al. ................... 710/6 |
| 7,502,329 | B2 * | 3/2009 | Li et al. .......................... 370/252 |
| 7,539,533 | B2 | 5/2009 | Tran |
| 7,558,622 | B2 | 7/2009 | Tran |
| 2002/0167961 | A1 * | 11/2002 | Haartsen ....................... 370/444 |
| 2003/0046296 | A1 * | 3/2003 | Doss et al. .................... 707/102 |
| 2005/0190695 | A1 * | 9/2005 | Phaal ............................ 370/229 |
| 2007/0127704 | A1 | 6/2007 | Marti et al. |
| 2007/0248114 | A1 | 10/2007 | Jia et al. |
| 2007/0265533 | A1 | 11/2007 | Tran |
| 2008/0001735 | A1 | 1/2008 | Tran |
| 2008/0004904 | A1 | 1/2008 | Tran |
| 2008/0117939 | A1 | 5/2008 | Ekbal et al. |
| 2008/0144560 | A1 | 6/2008 | Jia et al. |
| 2008/0200120 | A1 * | 8/2008 | Ruuska et al. ............... 455/41.2 |
| 2008/0281170 | A1 | 11/2008 | Eshelman et al. |
| 2009/0018875 | A1 | 1/2009 | Monatesti et al. |

(Continued)

FOREIGN PATENT DOCUMENTS

| EP | 1988688 | 11/2008 |
| EP | 2211586 | 7/2010 |

(Continued)

*Primary Examiner* — Afsar M Qureshi
(74) *Attorney, Agent, or Firm* — McDonnell Boehnen Hulbert & Berghoff LLP

(57) ABSTRACT

A communication-management method involves a recurring polling scheme, wherein network nodes are polled by a base station according to optimized and/or user-preferred polling intervals assigned to each network node. The polling interval assigned to a given node may be optimized to minimize and/or achieve user-preferred thresholds for energy consumption and latency associated with each network node in the sensor network. Optimized and/or user-preferred polling intervals may be constrained in accordance with various network performance considerations, for example, a recommended update interval for each network node, characteristics of the network nodes themselves, the duration of the timeslots at which the network nodes are polled, and/or other network performance considerations.

19 Claims, 7 Drawing Sheets

(56) References Cited

U.S. PATENT DOCUMENTS

| | | |
|---|---|---|
| 2009/0058635 A1 | 3/2009 | LaLonde et al. |
| 2009/0058636 A1 | 3/2009 | Gaskill et al. |
| 2009/0062887 A1 | 3/2009 | Mass et al. |
| 2009/0063193 A1 | 3/2009 | Barton et al. |
| 2009/0112114 A1 | 4/2009 | Ayyagari et al. |
| 2009/0131759 A1 | 5/2009 | Sims et al. |
| 2009/0185548 A1 | 7/2009 | Pratapagiri |
| 2009/0227876 A1 | 9/2009 | Tran |
| 2009/0227877 A1 | 9/2009 | Tran |
| 2009/0318779 A1 | 12/2009 | Tran |
| 2010/0039973 A1 | 2/2010 | Cavalcanti et al. |
| 2010/0128700 A1 | 5/2010 | Jia et al. |
| 2011/0051647 A1* | 3/2011 | Sampath et al. ............... 370/312 |
| 2012/0179824 A1* | 7/2012 | Jackson ........................ 709/226 |

FOREIGN PATENT DOCUMENTS

| | | |
|---|---|---|
| WO | 2005/046433 | 5/2005 |
| WO | 2005/060164 | 6/2005 |
| WO | 2006/087670 | 8/2006 |
| WO | 2006/100620 | 9/2006 |
| WO | 2007/054841 | 5/2007 |
| WO | 2007/124392 | 11/2007 |
| WO | 2007/127878 | 11/2007 |
| WO | 2008/027907 | 3/2008 |
| WO | 2008/061245 | 5/2008 |
| WO | 2008/075239 | 6/2008 |
| WO | 2009/032134 | 3/2009 |
| WO | 2009/054549 | 4/2009 |
| WO | 2009/112281 | 9/2009 |
| WO | 2010/042656 | 4/2010 |
| WO | 2010/059302 | 5/2010 |
| WO | 2010/097739 | 9/2010 |
| WO | 2010/100014 | 9/2010 |
| WO | 2010/113650 | 10/2010 |
| WO | 2010/126342 | 11/2010 |

* cited by examiner

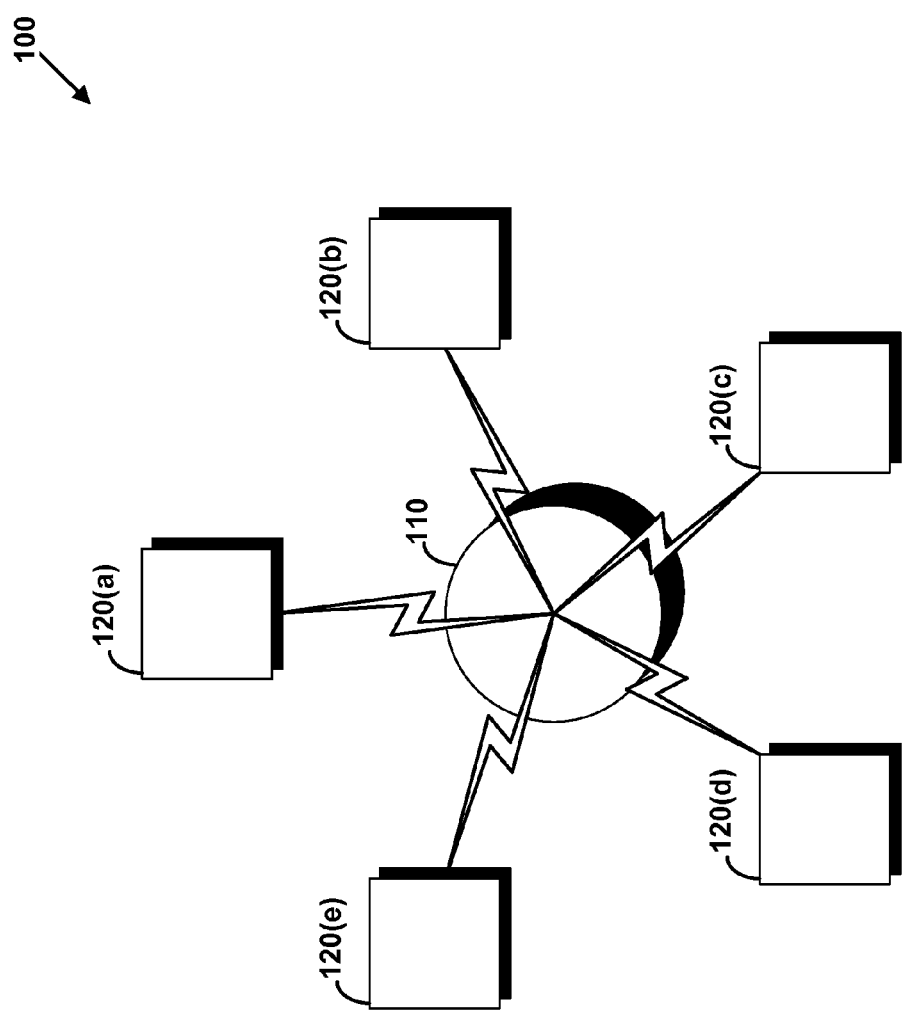

OPTIMIZATION OF POLLING PROTOCOLS IN SENSOR NETWORKS

RELATED APPLICATIONS

This application claims priority to U.S. Provisional Patent Application Ser. No. 61/299,687, entitled Minimizing Energy Consumption in Body Sensor Networks via Convex Optimization, filed Jan. 29, 2010, which is incorporated by reference herein in its entirety.

STATEMENT OF U.S. GOVERNMENT INTEREST

This invention was made with U.S. government support under grant numbers W911NF-07-1-0287 and W911NF-05-1-0491 awarded by the Army Research Office. The U.S. Government has certain rights in the invention.

BACKGROUND

One emerging area of networked communications is the provisioning of sensor networks. Sensor networks enable the gathering of information throughout an environment, and have applications, for example, in monitoring areas (such as battlefields, buildings, or other geographical areas), industrial processes (such as machine conditions or fluid flow rates), transportation systems (such as traffic flow or traffic density), and patient health (such as any number of physiological conditions of a given patient). Many other applications exist as well.

Generally, sensor networks consist of a set of network nodes, or sensor nodes, and a base station, or controller, with which the sensor nodes may communicate. The sensor nodes may be configured to monitor environment conditions in accordance with, for example, any of the applications mentioned herein. For example, in an industrial processes application, the sensor node may be configured to monitor an environment condition such as fluid flow rate (at some point in an industrial process). As another example, in a patient health application, the sensor node may be configured to monitor an environment condition such as a physiological condition (of a body).

A sensor network may assume any one or more of a variety of network topologies, examples of which may include star, ring, bus, tree, fully connected, cluster-based, mesh, and/or any other network topology now known or later developed. Further, the topology of a given sensor network may change, perhaps frequently.

Sensor networks may be wired or wireless. Among other benefits, wireless sensor networks may, generally, be deployed with less cost, effort, and resources than wired sensor networks. Also, wireless sensor networks are generally more flexible and robust, and may therefore be put to use in more applications.

In a wireless sensor network, the sensor nodes and base station typically communicate over an air interface according to an established communication protocol, or an agreed method of managing communications in the wireless communication network. Examples of common communication protocols include CDMA (e.g., EIA/TIA/IS-2000 Rel. 0, Rel. A, or other versions thereof ("IS-2000"), EIA/TIA/IS-856 Rel. 0, Rev. A, or other versions thereof ("IS-856"), etc.), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or any other communication protocol now known or later developed. A communication protocol may specify, among other things, data formats, address formats, switching and routing processes, and flow control processes for network nodes operating under the communication protocol. A communication protocol used by a given sensor network may incorporate one of the common communication protocols delineated above, or may incorporate a communication protocol that has been developed, at least in part, for sensor networks specifically.

Typical communication protocols employed by sensor networks may be broadly categorized into contention-based protocols and polling-based protocols. Contention-based protocols generally allow for sensor nodes to communicate in a given sensor network without pre-coordination. For example, a contention-based protocol may define the events that must occur when two or more sensor nodes attempt to simultaneously communicate on a given air interface, and establish rules by which sensor nodes are given opportunities to communicate on the given air interface.

On the other hand, polling-based protocols generally involve a central network node, such as a base station, which periodically interrogates sensor nodes in a round-robin, recurring, or other sequence to determine whether the sensor nodes have data to send to the base station. Polling-based protocols therefore require some degree of pre-coordination. The interrogation of a sensor node by the base station may take the form of a paging message, sent over a paging channel of the air interface, that serves to notify a sensor node that it is being paged.

The paging channel may be divided into a number of timeslots of equal length in which the base station may poll, or page, the sensor nodes. Each sensor node may be arranged to wake up and check the paging channel for a page with a given frequency. When paged, the sensor node may respond, or otherwise react, in a manner specified by the particular polling protocol under which the sensor network is operating. As one example, when paged, the sensor node may transmit certain data to the base station.

Generally speaking, the more often a sensor node is polled and transmits data, the more quickly the sensor node will lose energy. Therefore, in this respect, it is desirable for a sensor node to check for pages and transmit data relatively infrequently. However, there are competing considerations that make it desirable for a sensor node to check for pages and transmit data relatively frequently. For example, it may be desirable for the sensor node to transmit data to the base station relatively frequently if the data collected by the sensor node (e.g., as a result of monitoring an environment condition) represents information that is time sensitive or otherwise important. If the sensor node transmits data relatively frequently, the sensor node may transmit data with relatively low latency, where latency is the amount of time between when the sensor node is ready to transmit data and when the sensor node actually does transmit the data. In this respect, the lower the latency with which a sensor node transmits data, the better the performance of the sensor node—and therefore the sensor network—will be.

Attempts to improve the energy-efficiency of sensor networks have taken many forms, including attempts to improve sensor-transceiver design, sensor-network architecture, and energy-scavenging techniques. However, wireless communication is also an important factor in energy consumption in sensor networks, and therefore the development of efficient communication protocols, or methods of managing communications, for sensor networks is of particular interest.

SUMMARY OF THE INVENTION

Conserving the energy of sensor nodes, while achieving a desired level of performance, has proven to be a key challenge in sensor networks. A method of managing communications in a wireless sensor network that is designed to optimize and/or achieve user-preferred energy consumption and latency would be beneficial for many sensor network applications. Accordingly, disclosed herein is such a communication-management method. Various entities and systems that are configured to carry out aspects of the method are also disclosed.

The communication-management method disclosed herein comprises a recurring polling scheme, wherein network nodes are polled by a base station according to optimized and/or user-preferred polling intervals assigned to each network node. In some embodiments, the polling interval assigned to a given node may be optimized based on a minimization of energy consumption and/or latency associated with each network node in the sensor network. In other embodiments, the polling interval assigned to a given node is based on user preferences regarding energy consumption and/or latency thresholds associated with each network node in the sensor network. Thereby, energy use and latency of the sensor network may be optimized and/or operate according to user-preferred thresholds. In addition, polling intervals may be constrained in accordance with various network performance considerations, for example, a recommended update interval for each network node, characteristics of the network nodes themselves, the duration of the timselots at which the network nodes are polled, and/or other network performance considerations.

In one aspect, a base station assigns, to at least one network node in a set of network nodes, a respective polling interval based at least in part on a respective cost contribution of the at least one network node. During a timeslot selected according to the respective polling interval, the base station then (a) polls the at least one network node and (b) as a result of the polling, receives from the at least one network node one or more of network-node data and environment data.

In another aspect, prior to the assigning, the base station, or another entity, may determine the cost contribution of the at least one network node based on one or more of an energy-consumption metric associated with the at least one network node and a latency metric associated with the at least one network node. The determination of the cost contribution may be based on both (i) the respective cost contribution of the at least one sensor and (ii) a weighted-average summation of (a) an energy-consumption metric associated with each sensor in the set of sensors and (b) a latency metric associated with each sensor in the set of sensors. The determination may be further based on an optimization of a respective polling interval assigned to each sensor and/or a user-preferred threshold assigned to each sensor, wherein the respective polling interval assigned to each sensor is assigned so as to not exceed, for each sensor, (i) each of (a) a recommended update interval, (b) a buffer-fill constraint, and (c) an overhead constraint, and (ii) a timeslot-duration constraint.

In yet another aspect, the base station may resolve a scheduling conflict resulting from selecting the same timeslot at which to poll a first network node and a second network node. Resolving the scheduling conflict, therefore, may comprise, after the assigning, the base station detecting that a same first time slot has been selected for both the first network node and the second network node. Responsive to the detecting, the base station may select one of the first network node and the second network node based on a comparison between a priority metric of the first network node and a priority metric of the second network node. The base station may then poll the selected network node during the particular time slot.

These as well as other aspects and advantages will become apparent to those of ordinary skill in the art by reading the following detailed description, with reference where appropriate to the accompanying drawings.

BRIEF DESCRIPTION OF THE DRAWINGS

FIG. 1(a) depicts a simplified block diagram of an example sensor network having a star topology in accordance with some embodiments.

DETAILED DESCRIPTION

I. Example Sensor Network

As described herein, there are a number of different topologies that a given wireless communication network, such as a wireless sensor network, may assume. Accordingly, FIGS. 1(a) and 1(b) are simplified block diagrams of example sensor networks having, respectively, a star topology and a cluster-based topology.

Figure 1B:
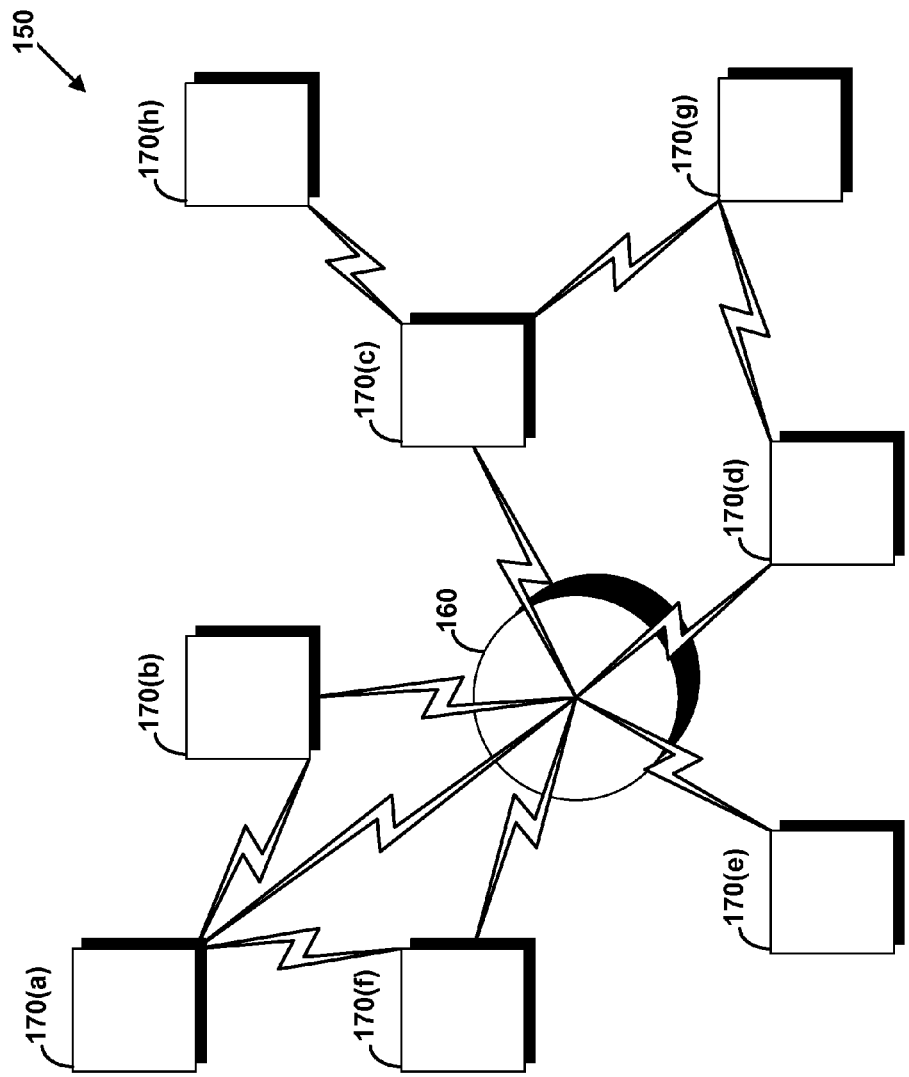
FIG. 1(b) depicts a simplified block diagram of an example sensor network having a cluster-based topology in accordance with some embodiments.

It should be understood that the arrangements described herein, including the network topologies described with respect to FIGS. 1(a) and 1(b), are set forth for purposes of example only. As such, those skilled in the art will appreciate that other arrangements and other elements (e.g., components, interfaces, functions, orders of functions, etc.) can be used instead, some elements may be added, and/or some elements may be omitted altogether. Further, those skilled in the art will appreciate that many of the elements described herein are functional elements that may be implemented as discrete or distributed components or in conjunction with other components, and in any suitable combination and location. Still further, various functions described herein as being performed by one or more entities may be carried out by hardware, firmware, and/or software. For instance, various functions may be carried out by a processor executing a set of program instructions written in any suitable programming language (e.g., C, C++, Java, etc.) and stored in memory.

a. Star Topology

With reference to FIG. 1(a), example sensor network 100 comprises base station 110 and set of network nodes 120(a)-(e). Base station 110 may, for instance, be a controller of sensor network 100. Network nodes 120(a)-(e) may, for instance, each be sensor nodes. That is, network nodes 120(a)-(e) may be arranged to measure at least one environment condition. Network nodes 120(a)-(e) may also be arranged to transmit data, for example, data representing measurements of environment conditions, to base station 110. Generally, base station 110 and network nodes 120(a)-(e) may be arranged to carry out various respective sensor-network functions described herein, and may take on a variety of forms.

For example, base station 110 may be any wireless-equipped base station, access node, access point, or other network node capable of wireless communication with network nodes 120(*a*)-(*e*). As one example, base station 110 may be a wireless communications station installed at a fixed location and used to communicate as part of, for example, a wireless telephone system or a push-to-talk two-way radio system. As another example, base station 110 may be a mobile device such as a cellular telephone, personal digital assistant (PDA), laptop, netbook, tablet, or any other wirelessly-equipped device now known or later developed. As yet another example, base station 110 may be any suitable arrangement of hardware and software that is, in whole, or in part, dedicated to controlling sensor network 100.

Generally, base station 110 may be a part of, or may be communicatively coupled to, a broader radio access network (RAN) which provides connectivity between one or more network nodes and one or more transport networks. For example, base station 110 may be communicatively coupled to a mobile switching center (MSC) that provides connectivity with a public switched telephone network (PSTN) which may connect with one or more remote entities, such as a remote telephone device. As another example, base station 110 may be communicatively coupled to an MSC that provides connectivity with a packet data serving node (PDSN) which may connect with one or more remote entities, such as a remote computer. According to such arrangements, any of network nodes 120(*a*)-(*e*), and/or base station 110 itself, may be arranged to communicate with remote network entities.

Alternatively, base station 110 may not be communicatively coupled to any other network other than the network comprising itself and sensor networks 120(*a*)-(*e*) (e.g., sensor network 100, as depicted).

As noted above, there are a number of different topologies that sensor network 100 may assume. As depicted in FIG. 1(*a*), in some embodiments, sensor network 100 takes on a star topology. Such a star topology is generally characterized by a base station that can send and/or receive wireless signals, or messages, directly from a number of remote network nodes. As shown in FIG. 1(*a*), base station 110 is in direct wireless communication with each network node in the set of network nodes 120(*a*)-(*e*).

In accordance with a typical star topology, while network nodes 120(*a*)-(*e*) can send and receive messages from base station 110, network nodes 120(*a*)-(*e*) generally do not send messages to one another. The star topology of sensor network 100 may provide for relatively low-latency communications between network nodes 120(*a*)-(*e*) and base station 110. That is, because network nodes 120(*a*)-(*e*) are in direct communication with base station 110, network nodes 120(*a*)-(*e*) may be able to communicate with base station 110 faster and more frequently than may be possible with other network topologies. However, each of network nodes 120(*a*)-(*e*) must be within the coverage area of base station 110 if they are to be able to carry out communications with base station 110. Therefore, the coverage area of sensor network 100 may be limited by, for example, the transmit range of base station 110 and/or network nodes 120(*a*)-(*e*).

b. Cluster-Based Topology

With reference to FIG. 1(*b*), a second example sensor network 150 comprises base station 160 and set of network nodes 170(*a*)-(*h*). Base station 160 and each network node in set of network nodes 170(*a*)-(*h*) may take forms similar to base station 110 and set of network nodes 120(*a*)-(*e*), respectively, as described above.

As depicted in FIG. 1(*b*), in some embodiments, sensor network 150 takes on a cluster-based topology. Similar to star topologies, a cluster-based topology may, generally, involve a base station that can send and/or receive wireless signals, or messages, directly from a number of remote network nodes. However, in cluster-based topologies, the network nodes are generally also allowed to communicate with one another.

As shown in FIG. 1(*b*), base station 110 is in direct wireless communication with network nodes 170(*a*)-(*f*). Network node 170(*a*) is also in direct wireless communication with each of network nodes 170(*b*) and 170(*f*), and therefore network node 170(*a*) may send and receive messages from network nodes 170(*b*) and 170(*f*), as well as base station 160. Thus, network node 170(*a*) may communicate with base station 160 by sending a message to base station 160. Alternatively, network node 170(*a*) may communicate with base station 160 by sending a message to either of network nodes 170(*b*) or 170(*f*), where the message indicates that it is intended for base station 160. Either of network nodes 170(*b*) or 170(*f*) may then relay the message to base station 160 by sending the message to base station 160 on behalf of network node 170(*a*).

Such an arrangement is typically referred to as a multihop communication, and is typical of cluster-based topologies. As depicted in FIG. 1(*b*), multihop communications, generally, enable a network node to use an intermediate node to forward a message to a desired node, such as base station 110. Intermediary network nodes that forward messages for other network nodes are often referred to as cluster-head nodes. Either of network nodes 170(*b*), 170(*f*), 170(*c*), and 170(*d*), for example, may be referred to as a cluster-head node.

Multihop communications enable a network node that is out of communications range with another network node, or a base station, to communicate with that network node or base station by way of an intermediary node. For example, with reference to FIG. 1(*b*), network node 170(*h*) is not in direct wireless communication with base station 160. Nonetheless, network node 170(*h*) is in direct wireless communication with network node 170(*c*). Therefore, network node 170(*h*) may communicate with base station 160 by sending a message to network node 170(*c*) that is then relayed by network node 170(*c*) to base station 160 on behalf of network node 170(*h*). As yet another example, network node 170(*g*), which is not in direct communication with base station 160, may similarly communicate with base station 160 by having either of network nodes 170(*c*) or 170(*d*) relay messages to base station 160 on its behalf.

The cluster-based topology of sensor network 150 may be more redundant than other network topologies. For example, if network node 170(*a*) loses the ability to communicate directly with base station 160 and network node 170(*f*), network node 170(*a*) may still be capable of communicating with base station 160 via network node 170(*b*) using multihop communication. Further, the cluster-based topology of sensor network 150 may enable the sensor network to cover a larger area than may be possible with other network topologies. For example, the coverage area of sensor network 150 is generally not limited by the transmit range of base station 160 or any individual network node in the set of network nodes 170(*a*)-(*h*). Instead the coverage area may be extended by, for example, simply adding more network nodes to the sensor network.

However, in a cluster-based topology, network nodes that are not in direct communication with base station 160, such as network nodes 170(*h*) and 170(*g*), may experience greater latency in communications with base station 160. That is, because multihop arrangements require the relay of a message by an intermediary node, network nodes that carry out multihop communications may do so more slowly and less frequently than network nodes in topologies comprising only direct communication arrangements. Further, the energy consumed by sensor networks carrying out multihop communications will generally be greater than the energy consumed by sensor networks that do not.

Both the star topology of sensor network 110 and the cluster-based topology of sensor network 150 are discussed further below, with reference to an example polling method.

II. Example Polling Method

Figure 2:
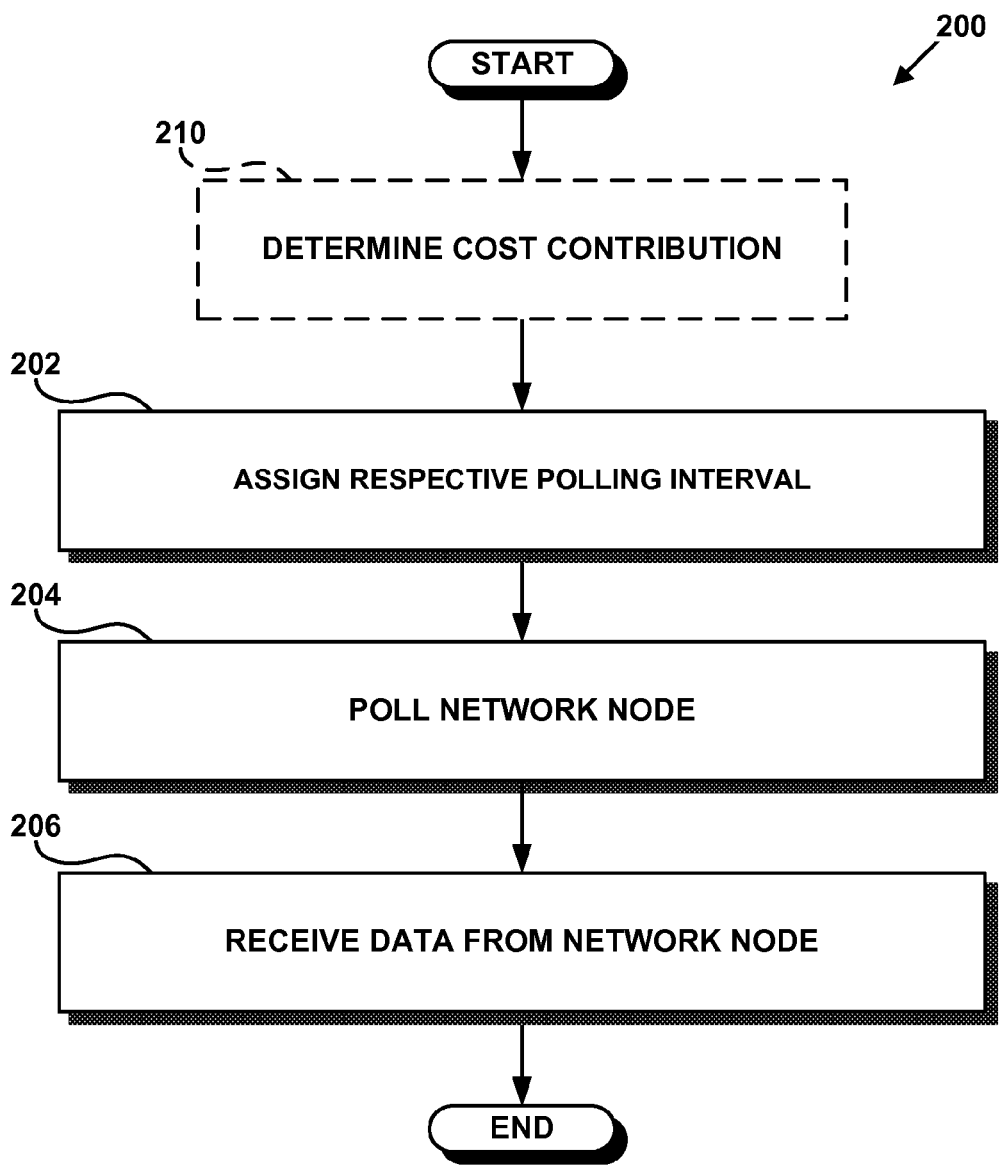
FIG. 2 depicts a simplified flow chart of a polling method in accordance with some embodiments.

FIG. 2 is a simplified flow chart of an example polling method 200 for polling network nodes in a sensor network. For purposes of illustration, example method 200 will first be discussed with reference to sensor network 100. Then, example method 200 will be discussed with reference to sensor network 150. It should be understood, however, that example method 200 may be applicable to communication systems other than those depicted in either of FIG. 1(a) or 1(b), as well.

One or more steps of example method 200 may be carried about by base station 110. Additionally, one or more steps of example method 200 may be carried out by an entity other than base station 110, for example another base station, another network entity, or any other device arranged to carry out one or more steps of example method 200. In one example, one or more steps of example method 200 may be embodied as program instructions stored on a physical and/or non-transitory computer-readable medium and executable by a processor. Such computer-readable media may include a magnetically or optically readable computer discs, hard-wired or preprogrammed chips (e.g., EEPROM semiconductor chips), nanotechnology memory, or other data storage media. Alternatively, instructions, data structures, and message structures related to the communication-management system may be transmitted over the Internet or other networks (including wireless networks) via a propagated signal on a propagation medium (e.g., electromagnetic wave(s), sound wave(s), etc.). For purposes of explanation, aspects of method 200 are described below as being carried out by base station 110. However, such an explanation should not be taken to be limiting.

Figure 3:
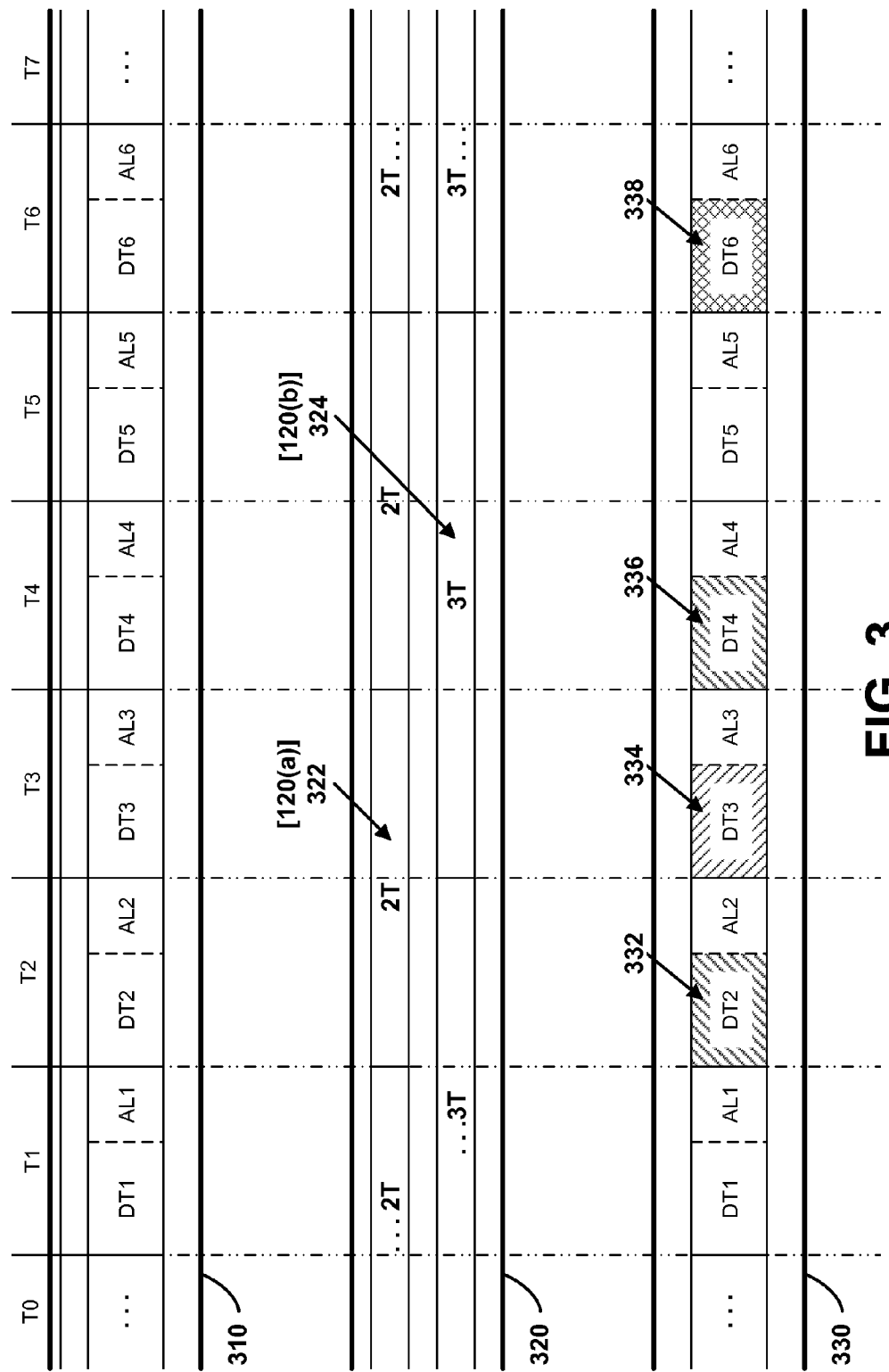
FIG. 3 depicts a simplified timing diagram indicating polling intervals and timeslots in accordance with some embodiments.

Generally, sensor network 100 may operate in a time-synchronized manner, wherein time is slotted into a number of timeslots of uniform length. Time may be slotted into a number of timeslots of non-uniform length as well. With reference to FIG. 3, polling timing diagram 310 depicts a number of timeslots of uniform length, timeslots T1-T6, of units of length T. Generally, therefore, each of timeslots T1-T6 are of the same duration, or the same length of time, T. While six complete timeslots are depicted in FIG. 3, those of skill in the art will appreciate that time before and after T1-T6 may be slotted into similar additional timeslots. For example, time before timeslot T1 may be slotted, as depicted by timeslot T0, which extends into the past relative to T1. Additionally, time after timeslot T6 may be slotted, as depicted by timeslot T7, which extends into the future relative to T6.

Each of timeslots T1-T6 may be subdivided into two or more subslots. In some embodiments, timeslots T1-T6 are subdivided into data transfer (DT) and alarm (AL) subslots. For example, timeslot T1 is depicted as subdivided into subslots DT1 and AL1, while timeslot T4 is subdivided into subslots DT4 and AL4.

Generally, base station 110 may poll a particular network node, such as network node 120(a), at a particular timeslot, such as timeslot T2. When polled, network node 120(a) may responsively transmit a data message to base station 110 during data-transfer subslot DT2. During alarm subslot AL2, and any other AL subslot, any of network nodes 120(a)-(e) may transmit an alarm message to base station 110. In this way, a network node may alert base station 110 of, for example, a critical condition, without waiting to be polled during a particular timeslot.

a. Polling

With reference again to FIG. 2, method 200 begins at step 202 with base station 110 assigning, to at least one network node in set of network nodes 120(a)-(e), for example, network node 120(a), a respective polling interval based at least in part on a respective cost contribution of network node 120(a). Then, at step 204, base station 110 polls network node 120(a). Then, at step 206, base station 110 receives from network node 120(a) one or more of network-node data and environment data. Each of steps 204 and 206 may be carried out during a particular timeslot selected by base station 110 according to the respective polling interval assigned to network node 120(a). Each of steps 202-206 are described in more detail below.

One of ordinary skill in the art will appreciate that the method depicted by FIG. 2 may be altered in a variety of ways. For example, the order of the steps may be rearranged, steps may be performed in parallel, steps may be omitted, and/or other steps may be included.

i. Assign Respective Polling Interval

Example method 200 begins at step 202 where base station 110 assigns at least one network node from set of network nodes 120(a)-(e), for example, network node 120(a), a respective polling interval based at least in part on a respective cost contribution of network node 120(a). That is, base station 110 may assign a polling interval to one, multiple, or every network node in set of network nodes 120(a)-(e).

With reference to FIG. 3, polling-interval timing diagram 320 depicts a first polling interval 322 and a second polling interval 324. First polling interval 322 may be assigned to a first network node, for example network node 120(a), and second polling interval 324 may be assigned to a second network node, for example network node 120(b). Polling intervals 322 and 324 are examples only, and other polling intervals may be used. Further, while the assignment of only two particular polling intervals to two respective network nodes is explicitly discussed with respect to FIG. 3, polling intervals may be assigned to any number of network nodes including one, multiple, or every network node in set of network nodes 120(a)-(e).

Example polling interval 322 has a duration of 2T, or a duration equal to two timeslots. On the other hand, example polling interval 324 has a duration of 3T, or a duration equal to three timeslots. Other polling intervals may be used as well. Other polling intervals may include other integer multiples of time T, for example, 5T, or 10T. Additional polling intervals may be non-integer multiples of T, for example 2.4T, or 2.9T. As will be discussed below, an optimized and/or user-preferred polling interval for assignment to network nodes may have been determined before step 202, so as to optimize and/or achieve user-preferred energy used and latency experienced by the network nodes in sensor network 100. Polling intervals may be assigned according to other considerations as well.

ii. Poll Network Node

At step 204, base station 110 polls network node 120(a) during a timeslot selected by base station 110 according to the respective polling interval assigned to network node 120(a) at step 202. For example, base station 110 may poll network node 120(a) during a timeslot, such as timeslot T2. On the other hand, base station 110 may poll network node 120(b) during a different timeslot, such as timeslot T3.

Before polling the at least one network node during a particular timeslot, however, base station 110 may select the particular timeslot according to the respective polling interval assigned to the at least one network node. Selection of a timeslot for polling a given network node, based on the polling interval assigned to that network node, may be done in a variety of ways. If a particular polling interval is an integer multiple of T, base station 110 may simply select timeslots that directly correspond to the duration of the assigned polling interval. For example, base station 110 may select timeslot T2 for polling network node 120(a) because network node 120(a) has been assigned polling interval 322 equal to 2T. Base station 110 may then select subsequent timeslots at which to poll network node 120(a) according, also, to polling interval 322 equal to 2T. More particularly, as depicted in polling timing diagram 330, base station 110 may select timeslots T2, T4, and T6 at which to poll network node 120(a), as indicated by polling call outs 332, 336, and 338 (and corresponding forward-slash shading), respectively. Base station 110 may select future timeslots not shown as well, such as T8, T10 and so on, at which to poll network node 120(a).

As another example, base station 110 may select timeslot T3 for polling network node 120(b) because network node 120(b) has been assigned polling interval 324 equal to 3T. Base station 110 may then select subsequent timeslots at which to poll network node 120(b) according, also, to polling interval 324 equal to 3T. More particularly, as depicted in polling timing diagram 330, base station 110 may select timeslots T3 and T6 at which to poll network node 120(b), as indicated by polling call outs 334 and 338 (and corresponding back-slash shading), respectively. Base station 110 may select future timeslots not shown as well, such as T9 and T12 and so on, at which to poll network node 120(b).

If, however, the polling interval assigned to a particular network node is a non-integer multiple of T, base station 110 may select a timeslot for polling the particular network node based on an approximation of the assigned polling interval. For example, base station 110 may approximate the polling interval by rounding the polling interval either up or down to the next integer multiple of T. Base station 110 may then select the timeslot according to the approximated polling interval.

For example, where a network node has been assigned a polling interval of 2.4T, base station 110 may select timeslot T2, according to an approximated polling interval of 2T, after rounding the polling interval down to 2T. As another example, where a network node has been assigned a polling interval of 2.9T, base station 110 may select timeslot T3, according to an approximated polling interval of 3T, after rounding the polling interval up to 3T.

Those of skill in the art will appreciate that other approximations of polling intervals may be used. As one example, base station 110 may simply drop any decimal remainder from a non-integer polling interval, such that polling intervals 2.4T and 2.9T would each be approximated as 2T. As another example, base station 110 may simply take as the approximated polling interval for a non-integer polling interval the next highest integer number, such that polling intervals 2.4T and 2.9T would each be approximated as 3T. As yet another example, base station 110 may randomly choose as the approximated polling interval for a non-integer polling interval, either the next highest or the next lowest integer.

Once base station 110 has selected a timeslot according to the respective polling interval, base station 110 then polls the network node during the timeslot. In some embodiments, base station 110 sends a polling message to the network node at the beginning of the particular timeslot, which the network node may interpret as an indication that the network node may communicate with base station 110 during that timeslot. As noted above, the particular manner in which base station 110 polls a given network node, and the particular manner in which the given network node responsively transmits data to base station 110, may take any one of a variety of forms now known or later developed. For instance, base station 110 may send the network node a polling message in the form of a paging message and the network node may be arranged to responsively transmit data to the base station during a data-transfer subslot of the timeslot.

For example, with reference to polling timing diagram 330, base station 110 may poll network node 120(a) at the start of timeslot T2, and during subslot DT2 network node 120(a) may responsively transmit data to base station 110. As another example, base station 110 may poll network node 120(b) at the start of timeslot T3, and during subslot DT3 network node 120(b) may transmit data to base station 110.

iii. Receive Data from Network Node

At step 206, base station 110 receives from network node 120(a) the data transmitted by network node 120(a) during the selected timeslot. The data may generally be any data that network node 120(a) is arranged to store, collect, generate, or otherwise maintain for transmission to base station 110. Generally, network node 120(a) may be arranged to transmit data in accordance with the particular application of sensor network 110.

The data transmitted by network node 120(a) may take the form of either network-node data and/or environment data. It should be understood that the characterizations of data as either network-node data and/or environment data is for purposes of explanation only, and should not be interpreted as limiting. Those of skill in the art will appreciate that the data transmitted by network node 120(a) may take any number of different forms and may correspond to any number of different types of information.

In some embodiments, network-node data represents various types of static information that does not vary with time. For example, network-node data may include information pertaining to static features of the network node, including various sensor hardware parameters. One such static feature may be a buffer size B of the network node that indicates an amount of data that the network node is capable of storing, for example, a number of bits, bytes, or other indication of storage space. Another static feature may be a measurement size (or length) M of measurements that the network node is configured to make, for example a number of bits, bytes, or other indication of measurement size. The measurement size M may generally indicate an amount of data generated by the network node per unit time. Yet another static feature may be a measurement frequency SF at which the network node is configured to take measurements, for example, a number of measurements per second or other suitable time period.

Yet another static feature still may be a relative rank RR of the network node. For example, the relative rank RR may indicate a relative priority of the network node with respect to other network nodes in the sensor networks. The relative rank RR may be assigned to the network node according to, for example, the relative importance of the network node to the overall performance of the sensor network. For example, if a given network node is configured to monitor a critical environmental condition, the network node may be assigned a relatively high relative rank RR. On the other hand, if a given network node is configured to monitor an unimportant environmental condition, the network node may be assigned a relatively low relative rank RR.

As described above, network node 120(a) is configured to transmit network-node data to base station 110. However, because network-node data does not generally vary with time, base station 110 may also be configured to store such network-node data without it having been transmitted or retransmitted to base station 110 by a network node. That is, base station 110 may store, in data storage, network-node data corresponding to one, multiple, or each network node in sensor network 110. This network-node data may be received from the network sensors, a manufacturer or other third party, and/or another data source. As discussed further below, base station 110 may use such network-node data for purposes of optimizing and/or determining user-preferred thresholds for the polling intervals assigned to network nodes in sensor network 100.

In some embodiments, data transmitted by network node 120(a) alternatively or additionally takes the form of environment data. Generally, environment data represents various types of dynamic information that may vary with time. For example, environment data may include information pertaining to environment conditions that sensor network 100 monitors. Environment data may take the form of an indicator function I(AD) which, in some embodiments, takes a value of 1 or 0. For example, if a network node has measured an environmental condition that is outside of a standard range, the network node may set an indicator function associated with that environmental condition equal to 1. In this way, the network node may provide an indication that some environment condition is out of the ordinary. Otherwise, the network node may leave the indicator function equal to a default value of 0.

As another example, environment data may include information pertaining to an environment condition measured by the network node. Such an environment condition may be a temperature, fluid flow rate, altitude, speed, or any other condition that the network node is configured to measure. Such examples of environment conditions are provided for purposes of example only and should not be taken to be limiting. Those of skill in the art will appreciate that many other environment conditions may be captured as well.

b. Determining Cost Contribution

At step 210, prior to assigning a respective polling interval, base station 110, or some other entity or combination of entities, may determine the cost contribution of network node 120(a). In some embodiments, the cost contribution of various network nodes is determined for the purpose of assigning optimized and/or user-preferred polling intervals to the various network nodes. In other words, a cost contribution may be determined for each network node in the set of network nodes 120(a)-(e), wherein the polling interval assigned to each network node is optimized so as to minimize the total cost of sensor network 100, set according to one or more user-preferred thresholds, and/or otherwise achieves a desirable result. Generally, the cost contribution of a given network node may be determined based on a variety of different cost metrics, depending on those characteristics of sensor network 100 that are to be optimized or set according to a user-preferred threshold. Thus, as used herein, the term "cost" is a descriptive term representing, for example, the amount of a given metric, such as energy or latency, used or experienced by a network node or sensor network 100.

For purposes of minimizing the total energy consumption and/or achieving a user-preferred energy consumption of sensor network 100, the cost determination may be based on at least an energy-consumption metric associated with network node 120(a). As another example, for purposes of minimizing the average latency of network nodes and/or achieving a user-preferred average latency of network nodes in sensor network 100, the cost determination may be based on at least a latency metric associated with network node 120(a). Of course, for purposes of minimizing and/or achieving a user-preferred value for both the total energy consumption of sensor network 100 and the average latency of network nodes in sensor network 100, the cost determination may be based on both an energy-consumption metric and a latency metric. Further, the cost determination may also be based on cost metrics associated with multiple, or all, of network nodes 120(a)-(e). Those of skill in the art will appreciate that other characteristics may be minimized or set according to a user-preferred threshold and, correspondingly, that the cost determination may be based on other metrics as well.

Generally, determination of the optimum and/or user-preferred polling interval for each network node may involve a consideration of tradeoffs between the cost metrics of interest. For example, while energy consumed by a particular network node may be desirably reduced by increasing the duration of the polling interval assigned to that network node, increasing the duration of the polling interval may also undesirably increase the latency experienced by the network node. Further, depending on the environment conditions monitored by a given network node, it may be undesirable for the network node to be assigned a polling interval that is longer than a given duration. That is, it may be necessary to receive data updates from a given network node at time intervals that are less than a maximum time interval.

Described generally herein, therefore, is a technique for minimizing the cost contribution and/or achieving a user-preferred cost contribution of sensor nodes in a sensor network, and for minimizing the total cost and/or achieving a user-preferred total cost of the sensor network itself. Aspects of the technique described below may be carried out, at step 210, by various functional entities described herein such as base station 110, another network node, or another suitable functional entity. Further, aspects of the technique described below involve the specification of certain parameters or constraints. Specification of such parameters or constraints may be done as part of the design of a particular sensor network, for example by a network engineer or other individual involved with the specification of the sensor network. On the other hand, such parameters or constraints may be inherent properties of the sensor network itself, such as features of the particular sensor nodes in the sensor network.

The particular technique described below is set forth for purposes of explanation. Those of skill in the art will appreciate that modifications to, and variations on, certain aspects of the technique described below may be used.

i. Framework

Assume that a given sensor network comprises N sensors, $S_1, \ldots S_i, \ldots S_N$. Generally, each sensor is arranged to monitor at least one environment condition. The transmission rate used by the base station and all the sensors is DR bits per second (bps). Each sensor $S_i$ has a buffer of size $B_i$ bits and collects measurement samples of length $M_i$ bits at a frequency of $SF_i$ Hz.

Based on the importance of the environment condition being monitored, each sensor is assigned a relative rank $RR_i$ between 1 to N, such that $RR_i \neq RR_j$ for $i \neq j$. That is, no two sensors are assigned the same relative rank. In the context of a body sensor network, for example, an electrocardiogram (ECG) sensor may be ranked with a higher relative rank than a temperature sensor.

The transmission rate DR, buffer size $B_i$, measurement size $M_i$, and measurement frequency $SF_i$, are parameters that do not change with time. In other words, these parameters are static features of a particular sensor $S_i$.

Further, each sensor $S_i$ is associated with several time-varying parameters including detection of out-of-range environment conditions, which may be represented as an indicator function I(AD), which, in some embodiments, is 1 if the sensor has recorded Abnormal Data (i.e., out-of-range environment conditions) and 0 otherwise. Other time-varying parameters include RB(t) which indicates Remaining Buffer space at time t, RB(t) which indicates Remaining Buffer space at time t, and RE(t) which indicates remaining energy at time t. Each sensor network is polled by the base station in accordance with a polling interval $T_i$.

Within this framework, optimization and/or achievement of user-preferred threshold of the energy used by and the latency experienced by the sensors in the sensor network generally involves (a) identifying certain constraints placed on the performance of the sensors and sensor networks, (b) identifying a cost function for each sensor, (c) identifying a latency function for each sensor, and (d) optimizing and/or achieving a user-preferred threshold for a total cost function of the sensor network based on the cost function and latency function of each network node in the sensor network that is to be polled. The technique generally involves optimizing and/or achieving a user-preferred threshold for the polling interval $T_i$ of each sensor, such that the total cost function of the sensor network is minimized or satisfies a user-preferred threshold.

ii. Constraints

Depending on the sensor network, and the particular application of the sensor network, an upper bound on the polling interval $T_{ir}$ may be specified for each sensor $S_i$. Thus, for a polling interval $T_i$ assigned to sensor $S_i$:

$$0 \leq T_i \leq T_{ir}; \text{ for } i=1,2,\ldots,N \quad (1)$$

Since each sensor $S_i$ collects measurements of length $M_i$ at a frequency $SF_i$, the data collected in the polling interval $T_i$ is given by $SF_i \times M_i \times T_i$. Between transmissions of data, a sensor must only be allowed to fill a fraction $x_i$ of its buffer, because otherwise a buffer overflow would result. Hence, the amount of data held in a sensor's buffer at any given time does not exceed $x_i \times B_i$. Further, there is an overhead (Ov) of additional bits representing overhead information, such as, for example, pilot and sync, security, error correction, and/or control information. Thus, each update consists of $(SF_i \times M_i \times T_i + Ov)$ bits. In some embodiments, in order to ensure that old data (i.e., data collected during a prior polling interval) does not accumulate in the buffer, all the data collected by a sensor $S_i$ during a particular polling interval $T_i$ is transmitted to the base station during the next timeslot at which the sensor $S_i$ is polled. Given the transmission rate as DR and the length of data update subslot as DT, the total data that can be transferred by a sensor $S_i$ during a given data update subslot is DT×DR bits, imposing the following constraint on the respective polling interval $T_i$ of each sensor $S_i$ in the sensor network:

$$(SF_i \times M_i \times T_i) \leq x_i \times B_i \text{ and}$$

$$(SF_i \times M_i \times T_i + Ov) \leq DT \times DR$$

$$\text{i.e. } T_i \leq \min\left(\frac{x_i \times B_i}{SF_i \times M_i}, \frac{DT \times DR - Ov}{SF_i \times M_i}\right); \text{ for } i=1,\ldots,N \quad (2)$$

Additionally, each timeslot is of length T, which gives 1/T slots in a unit time interval. Since each sensor occupies $1/T_i$ slots in this interval, and each timeslot can be assigned to at most one sensor, the following constraint may also be imposed:

$$\sum_{i=1}^{N} \frac{1}{T_i} \leq \frac{1}{T} \quad (3)$$

iii. Energy Cost Function

As noted above, the energy cost of a given sensor, and therefore the overall energy cost of the sensor network, may be determined based on an energy-consumption metric associated with each sensor. The energy-consumption metric may be represented by an energy cost function.

Each sensor $S_i$ sends $(SF_i \times M_i \times T_i + Ov)$ bits in each date update subslot of the timeslot during which the sensor $S_i$ polled. The duration of this transmission is therefore given by $(SF_i \times M_i \times T_i + Ov)/DR$. If the power consumption of the sensor radio in the sensor in transmit mode is $Ptx_i$, the energy consumption for this transmission is given by $Ptx_i \times (SF_i \times M_i \times T_i + Ov)/DR$. Since a sensor $S_i$ performs $1/T_i$ updates in a unit time interval, the energy consumption in that unit time interval is:

$$E_i = \frac{1}{T_i} \times Ptx_i \times \frac{SF_i \times M_i \times T_i \times O_v}{DR} = \frac{Ptx_i \times SF_i \times M_i}{DR} + \frac{Ptx_i \times O_v}{DR \times T_i} = E_0 + E_i(T_i) \quad (4)$$

where the term $E_O$ represents the minimum energy required to transmit the data and $Ei(T_i)$ is an overhead energy. Since $E_O$ is independent of $T_i$, generally, only $Ei(T_i)$ is relevant as an energy consideration when optimizing the energy cost for each sensor.

The importance of energy consumption could be unequal for different sensors, and therefore the total energy function E for the sensor network is a weighted sum of the variable energy consumption, or $Ei(T_i)$, for each sensor. Thus:

$$E = \sum_{i=1}^{N} \alpha_i E_i(T_i) = \sum_{i=1}^{N} \alpha_i \frac{Ptx_i \times O_v}{DR \times T_i} \quad (5)$$

where $\alpha_i$ is the relative weight assigned to energy consumed by sensor $S_i$, with $0 \leq \alpha_i \leq 1$. In general, a sensor that is more energy constrained may be assigned a higher value of $\alpha_i$.

Thus, the energy-consumption metric associated with each sensor may generally be described by an energy-cost function comprising a ratio of (i) a product of a power consumption of a sensor radio of the at least one sensor and a number of overhead bits transmitted by the at least one sensor, and (ii) a product of a data rate of transmission of the at least one sensor and a polling interval of the at least one sensor. Further, the total energy-cost function of the sensor network may generally be described as a weighted summation of each energy-cost function associated with each sensor in the sensor network.

iv. Latency Cost Function

As noted above, the latency cost of a given sensor, and therefore the overall latency cost of the sensor network, may be determined based on a latency metric associated with each sensor. The latency metric may be represented by a latency cost function.

The latency is defined as the time interval between the collection of data during a given measurement by a sensor and transmission of that data to the base station. Generally, each sensor collects measurement samples at a constant rate, and transmits the data corresponding to those measurements to the base station approximately once every polling interval $T_i$. The precise amount of time between data transmissions may depend on the particular timeslot assigned to a sensor for a given transmission of data.

Since, generally, the duration of the data update subslot of a given timeslot is much less than the polling interval $T_i$, the average latency for a given measurement is approximately given, in the present optimization technique, as $L_i = T_i/2$.

Therefore, the total latency function L for the sensor network is a weighted sum of the average latency, for each sensor. Thus:

$$L = \sum_{i=1}^{N} \beta_i \times \frac{T_i}{2} \quad (6)$$

where $\beta_i$ is the weight assigned to sensor $S_i$, with $0 \le \beta_i \le 1$. Generally, a higher value of $\beta_i$ indicates a higher priority of minimizing the latency of sensor $\beta_i$.

Thus, the latency metric associated with each sensor may generally be described by a latency function comprising an average latency. The total latency function of the sensor network may generally be described as a weighted summation of each latency function associated with each sensor in the sensor network.

v. Energy and Latency Cost Function

In some embodiments, the overall cost function of the sensor network may be defined according to a sum of the total energy contribution function E and the total latency function L. Generally, the energy contribution function E and the latency function L may be weighted according to an energy-latency factor $\lambda$. In practice, $\lambda$ may reflect the importance given to latency considerations relative to energy consumption considerations, in a given sensor network, or a given sensor network application. For example, if latency is not considered important at all in a particular application, $\lambda$ may be set to zero, to achieve minimum energy consumption in the sensor network. On the other hand, of course, if latency is considered very important in a particular application, $\lambda$ may be set to one, so as to achieve full consideration of latency with respect to energy consumption.

The overall cost function incorporates a consideration of both energy and latency, and is defined as:

$$C = E + \lambda \times L = \sum_{i=1}^{N} \left( \alpha_i \frac{Ptx_i \times O_v}{DR} \times \frac{1}{T_i} + \lambda \times \frac{\beta_i}{2} \times T_i \right) \quad (7)$$

Thus, the total cost of the sensor network may generally be described by a total-cost function comprising a weighted-average summation of (a) an energy-consumption metric associated with each sensor in the set of sensors and (b) a latency metric associated with each sensor in the set of sensors.

By combining equations 1, 2, and 3, with the overall cost function 7, the total cost of the sensor network may be optimized according to:

$$\text{minimize} \sum_{i=1}^{N} \left( \alpha_i \frac{Ptx_i \times O_v}{DR} \times \frac{1}{T_i} + \lambda \times \frac{\beta_i}{2} \times T_i \right) \quad (8)$$

such that $$0 \le T_i \le \min\left(T_{ir}, \frac{x_i \times B_i}{SF_i \times M_i}, \frac{DT \times DR - O_v}{SF_i \times M_i}\right)$$

$$\sum_{i=1}^{N} \frac{1}{T_i} \le \frac{1}{T} \quad (9)$$

Thus, the total cost of the sensor network may generally be optimized by minimizing (ii) a weighted-average summation of (a) an energy-consumption metric associated with each sensor in the set of sensors and (b) a latency metric associated with each sensor in the set of sensors. The technique may be further based on an optimization of a respective polling interval and/or achievement of a user-preferred respective polling interval assigned to each sensor, and wherein the respective polling interval assigned to each sensor is assigned so as to not exceed, for each sensor, (i) each of (a) a recommended update interval, (b) a buffer-fill constraint, and (c) an overhead constraint, and (ii) a timeslot-duration constraint. Minimizing the total cost and/or achieving a user-preferred total cost of the sensor network in this way results in the determination of an optimum and/or user-preferred polling interval, $T_i$, for each sensor in the sensor network.

With reference to equation 7, the cost contribution of each sensor $S_i$ can be obtained as:

$$C_i = \alpha_i \frac{Ptx_i \times O_v}{DR \times T_i} + \lambda \times \beta_i \times \frac{T_i}{2} \quad (10)$$

Equation 10 reflects sensor $S_i$'s share of the total cost of the sensor network, and in this sense, provides an indication of the relative importance of sensor $S_i$. In general, this cost may be lower for sensors that monitor parameters of high importance. The utility of each sensor may be defined as the negative of this cost. Thus, minimizing energy and latency, and determining optimized and/or user-preferred polling intervals, is based, at least in this sense, on the cost contribution of each network node in the network.

Those of skill in the art will understand that, in some embodiments, aspects of the technique described herein may take the form of a convex optimization problem. That is, by noting a tradeoff between energy consumption and latency, the technique formulates a convex cost function used to optimize corresponding energy-consumption and latency metrics. The convex optimization problem is solved by determining optimum polling intervals for each sensor in the sensor network and, thereby, achieving a minimum total cost of the sensor network. In other words, the convex optimization problem has a polynomial time solution that provides optimal performance in terms of energy consumption and latency.

c. Resolving Scheduling Conflicts

Generally, the optimal and/or user-preferred polling interval $T_i$ assigned to each network node based on the cost contribution calculation will be assigned such that no two network nodes will be assigned the same polling interval.

However, due to the recurrent nature of the polling scheme in some embodiments, it is possible that base station 110 may select the same timeslot for polling two or more network nodes. For example, recall, with reference to FIG. 3, that polling timing diagram 330 depicts base station 110 selecting timeslots T2, T4, and T6 for polling network node 120(*a*), in accordance with an assigned polling interval 322 equal to 2T. Polling timing diagram 330 also depicts base station 110 selecting time slots T3 and T6 for polling network node 120(b), in accordance with an assigned polling interval 324 equal to 3T. Thus, in the example depicted by FIG. 3, base station 110 selects timeslot T6 for polling both network node 120(a) and network node 120(b), resulting in a scheduling conflict during timeslot T6.

That is, in polling arrangements, it may be undesirable to poll, or base station 110 may not be capable of polling, more than one network node during a single timeslot. For example, base station 110 may not be able to address a paging message to more than one network node at a time. As another example, base station 110 may not be able to receive transmissions during a particular data update period, such as data update period DT6, from more than one network node.

One approach to resolving such a scheduling conflict may involve simply selecting for polling at the timeslot during which the conflict occurs the network node that has a highest priority. For example, if network node 120(a) has a higher priority than network node 120(b), base station 120 may select the timeslot during which the conflict occurs to poll network node 120(a), and then select a timeslot after which the conflict occurs to poll network node 120(b). However, such an approach requires that the relative priority of the network nodes not change with time, which may be undesirable.

According to embodiments of the technology, instead, base station 110 may implement a temporal function that computes the relative priorities of the network nodes at the time of the conflict. As a result, base station 110 may be able to poll, during the timeslot at which the scheduling conflict occurs, the network node having the highest priority at that particular point in time.

Note that more than two sensors may initially be selected for polling during a particular timeslot. In such a case, the timeslot during which the conflict occurs may be selected for the network node having the highest priority as determined by conflict resolution, and then the conflict resolution may be repeated with the remaining network nodes until all network nodes are assigned to different timeslots.

Figure 4:
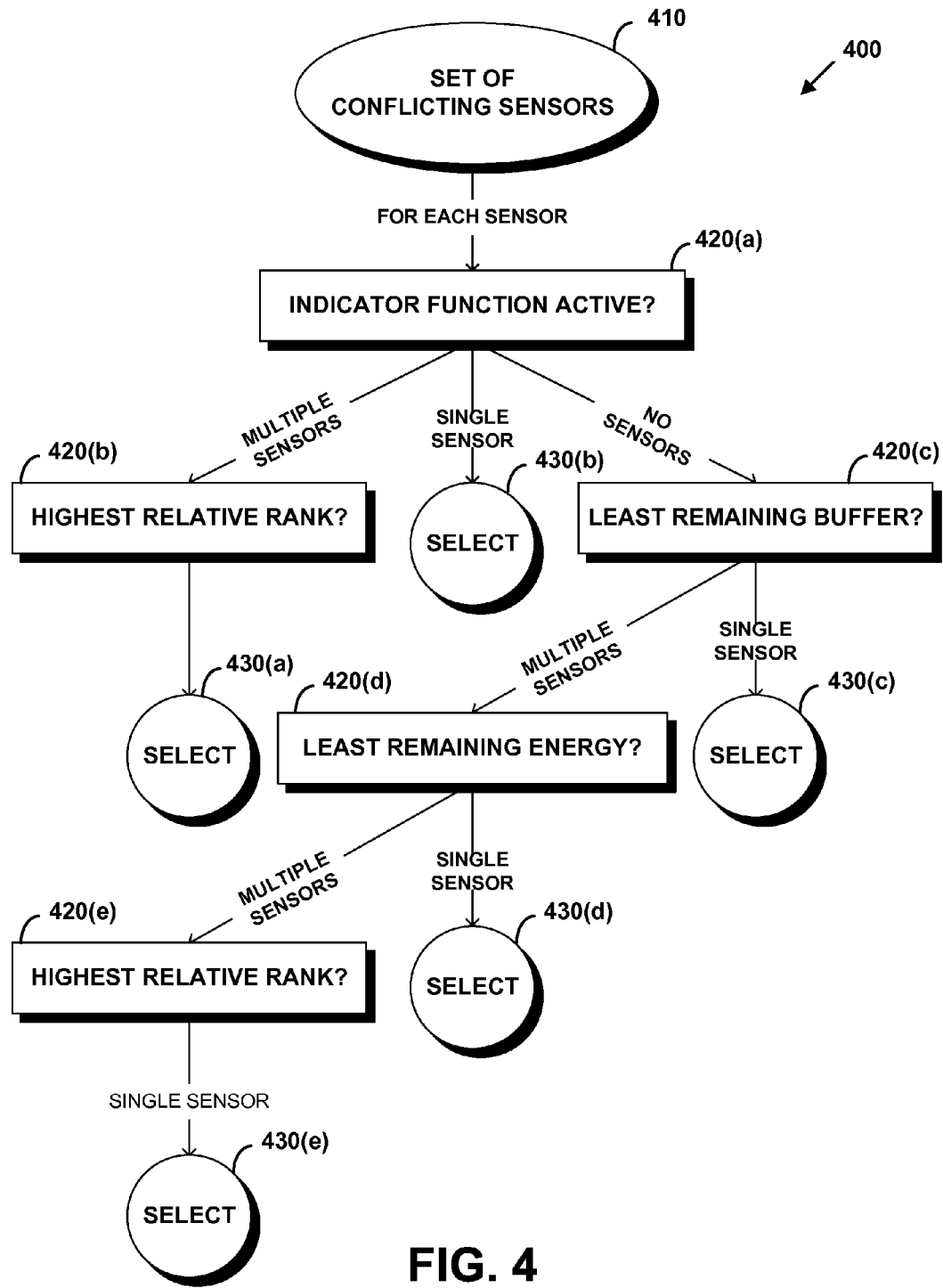
FIG. 4 depicts a simplified conflict resolution flowchart in accordance with some embodiments.

Thus, FIG. 4 depicts a simplified conflict resolution flowchart 400 in accordance with some embodiments. In general, conflict resolution may involve comparing various respective priority metrics associated with a given network node with corresponding respective priority metrics associated with each conflicting network node. Some of the priority metrics may not vary with time. For example, one priority metric may be a relative rank of the network node that may be predetermined, as explained above. On the other hand, some of the priority metrics may vary with time.

Generally, the time varying priority metrics may comprise information provided to base station 110 by the network node. One example of a time-varying priority metric may include environment data, such as an indicator function I(AD), which the network node may set to 1 (active) if it has measured an environmental condition that is outside of a normal range, and may set to 0 if not. Another example of a time-varying priority metric is a remaining buffer space RB(t) of the network node. Yet another example of time-varying priority metric is a remaining energy RE(t) of the network node. Other time varying priority-metrics may be used as well. For those priority metrics that vary with time, base station 110 may use the priority metric information last received from the network node for resolving scheduling conflicts with respect to that network node.

As depicted by conflict resolution flowchart 400, a set of conflicting sensor nodes 410 is first evaluated to determine whether any of the conflicting sensor nodes has an active indicator function, at decision point 420(a). If more than one of the conflicting sensor nodes has an active indicator function, that subset of the conflicting sensor nodes is evaluated to determine which sensor node in the subset of sensor nodes has a highest relative rank, at decision point 420(b). At selection point 430(a), the sensor node in the subset of sensor nodes that has the highest relative rank is then selected for polling at the conflict timeslot.

If a single sensor node in the set of conflicting sensor nodes 410 has an active indicator function, that sensor node is selected for polling at the conflict timeslot, at selection point 430(b).

If no sensor node in the set of conflicting sensor nodes 410 has an active indicator function, set of conflicting sensor nodes 410 is then evaluated to determine which sensor node in the conflicting sensor nodes has the least remaining buffer space RB(t), at decision point 420(c). At selection point 430(c), the sensor that has the least remaining buffer space RB(t) is then selected for polling at the conflict timeslot.

If at least two sensor nodes have the same, or substantially the same, remaining buffer space RB(t), that subset of sensor nodes is then evaluated to determine which sensor node in the subset of sensor nodes has the least remaining energy RE(t). At selection point 430(d), the sensor node in the subset of sensor nodes that has the least remaining buffer space RE(t) is then selected for polling at the conflict timeslot.

If at least two sensor nodes that are evaluated at decision point 420(d) have the same, or substantially the same, remaining energy RE(t), that subset of sensor nodes is then evaluated to determine which sensor node in the subset of sensor nodes has the highest relative rank, at decision point 420(e). At selection point 430(e), the sensor node in the subset of sensor nodes that has the highest relative rank is then selected for polling at the conflict timeslot.

Thus, in sum, conflict resolution may comprise, after base station 110 assigns a polling interval to network node 120(a), detecting that a same first time slot has been selected for both network node 120(a) and network node 120(b). Base station 110 may then, responsive to the detecting, select one of network node 120(a) and network node 120(b) based on a comparison between a priority metric of network node 120(a) and a priority metric of network node 120(b). Base station may then poll network node 120(a) during the particular time slot. Base station 110 may then poll network node 120(b) during a time slot after the timeslot at which it polls network node 120(a).

The approach to conflict resolution discussed above may be implemented in software, hardware, or any combination thereof. For example, aspects of the conflict resolution may be carried out by base station 110, or may be carried out by any other suitable entity arranged to carried out aspects of the conflict resolution. In another example, aspects of the conflict resolution may be embodied as program instructions stored on a physical and/or non-transitory computer-readable medium and executable by a processor.

d. Cluster-Based Topology Embodiments

While certain functions and aspects of the present technology have been described with respect to sensor network 100 as depicted in FIG. 1(a), certain functions and aspects of the present technology may be carried out in other sensor networks, such as sensor network 150 as depicted in FIG. 1(b). That is, certain functions and aspects of the present technology may be carried out in a sensor network having a cluster-based topology. Of course, functions and aspects of the present technology may be carried out in sensor networks having other topologies as well.

Base station 160 may poll network nodes in sensor network 150 that are in direct communication with base station 160 in a manner similar to that in which base station 110 polls network nodes in sensor network 100, as described above. However, because the network nodes that are in direct communication with base station 160 may also serve as relay nodes for network nodes that are not in direct communication with base station 160, additional parameters may be considered when optimizing and/or determining user-preferred polling intervals for network nodes in cluster-based topologies.

As one example, network node 170(c) may require a first timeslot to transmit its own data to base station 160, and may require a second timeslot to transmit data on behalf of network node 170(h). Therefore, the duration of the polling interval assigned to network node 170(c) may be further constrained by the time required for the transmission of data on behalf of network node 170(h). In other words, the duration of the polling interval may be constrained by the duration of a timeslot, in addition to any other constraints, such as a recommended update interval.

As another example, network node 170(c) may require energy to transmit its own data to base station 160, and may require additional energy to transmit data on behalf of network node 170(h). Further, network node 170(h) will require energy to transmit its own data to network node 170(c). Even further, network node 170(c) will require additional energy to receive the data transmitted by network node 170(h). Therefore, the energy-consumption function of network nodes in a cluster-based topology may incorporate additional energy considerations arising from the relay function performed by some network nodes in the sensor network.

As yet another example, network node 170(c) may require additional time to both transmit its own data and transmit data on behalf of network node 170(h). As noted above, network node 170(c) may require an additional data update period, during an additional timeslot, for the transmission of data received from network node 170(h). Therefore, the latency function of network nodes in a cluster-based topology may incorporate additional latency considerations arising from the relay function performed by some network nodes in the sensor network.

e. Body-Sensor Network Application

One application that may be particularly benefited by aspects of the sensor network functions described herein is a body sensor network. Body sensor networks (BSNs) generally enable continuous, non-intrusive and remote health monitoring of a given body. In general, a body sensor network may include a base station (or controller) and multiple sensors. The base station or sensors may be, for example, worn, carried, or implanted internal to the body. In some embodiments, the base station may take the form of a mobile device, such as any of those mobile devices discussed above.

Generally, sensors in a body sensor network may be severely energy constrained as a result of running off a small battery and/or energy scavenging techniques. Minimizing energy consumption may therefore be beneficial in body sensor networks.

Further, data received from sensors by the base station in a body sensor network may be particularly time sensitive. For example, a particular sensor may be configured to monitor a vital environment condition, such as a vital physiologic parameter. Physiological parameters that are monitored by a body sensor network may include, among other physiological parameters, temperature, heart rate, breathing rate, blood pressure, glucose levels, or pulse. The provision of optimized and/or user-preferred polling intervals within a technique that allows for the specification of polling interval constraints is therefore beneficial in body sensor networks. For example, a physician may specify a maximum polling interval for a given sensor node, in accordance with physician requirements.

Figure 6:
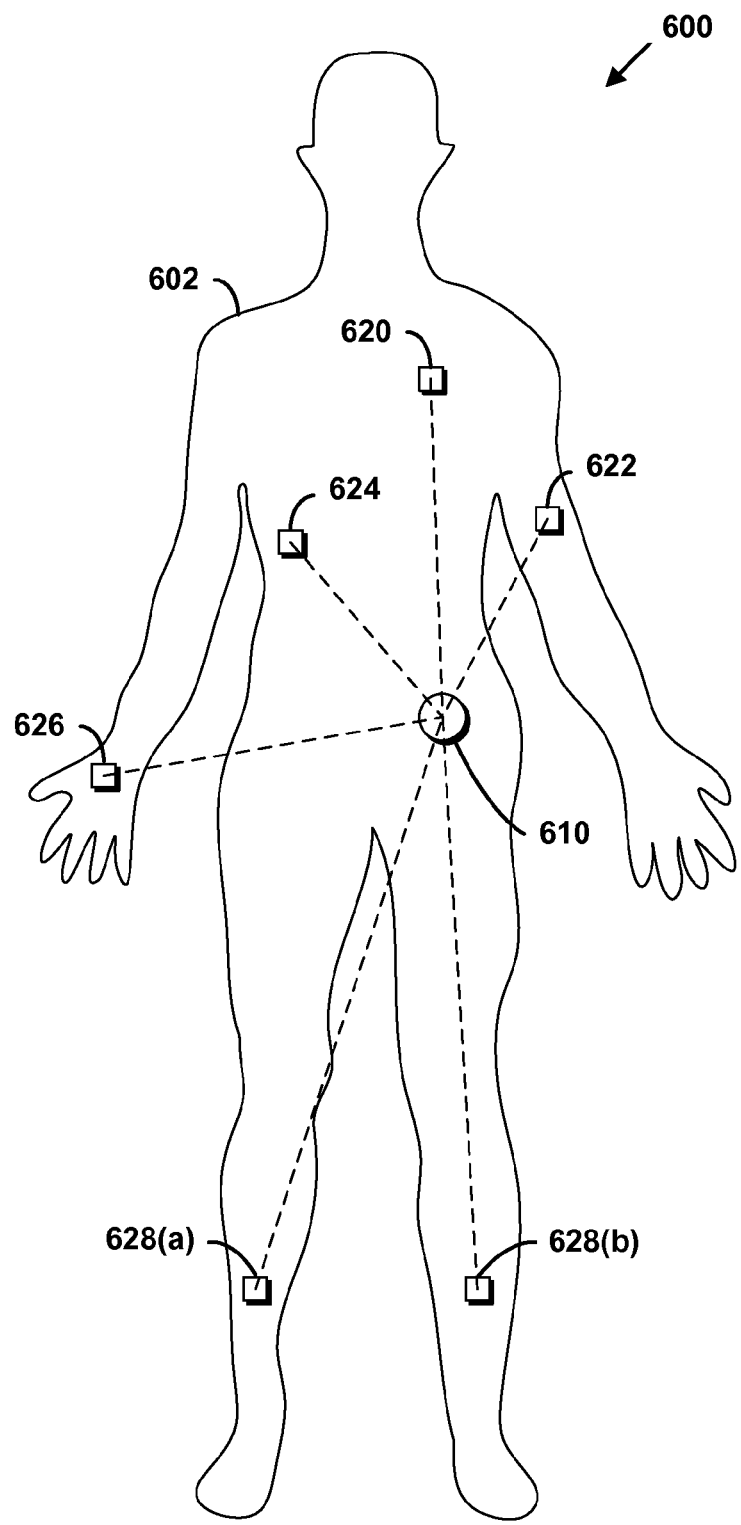
FIG. 6 depicts a simplified diagram of a deployed body sensor network.

FIG. 6 depicts a simplified diagram of a deployed body sensor network 600. Body sensor network 600 comprises a base station 610 that is, for example, wearable by patient 602. Body sensor network 600 also comprises sensor nodes that are in communication with base station 610, such as sensor nodes 620, 622, 624, 626, 628(a), and 628(b), which may be, for example, implanted in or worn by patient 602. In an example embodiment, sensor node 620 may monitor heart rate, sensor node 622 may monitor temperature, sensor node 624 may monitor glucose levels, sensor node 626 may monitor pulse, and sensor nodes 628(a) and 628(b) may each include an accelerometer that monitors the motion of patient 602. Body sensor network 600 is described for purposes of explanation only and should not be taken as limiting.

III. Example Base Station

Figure 5:
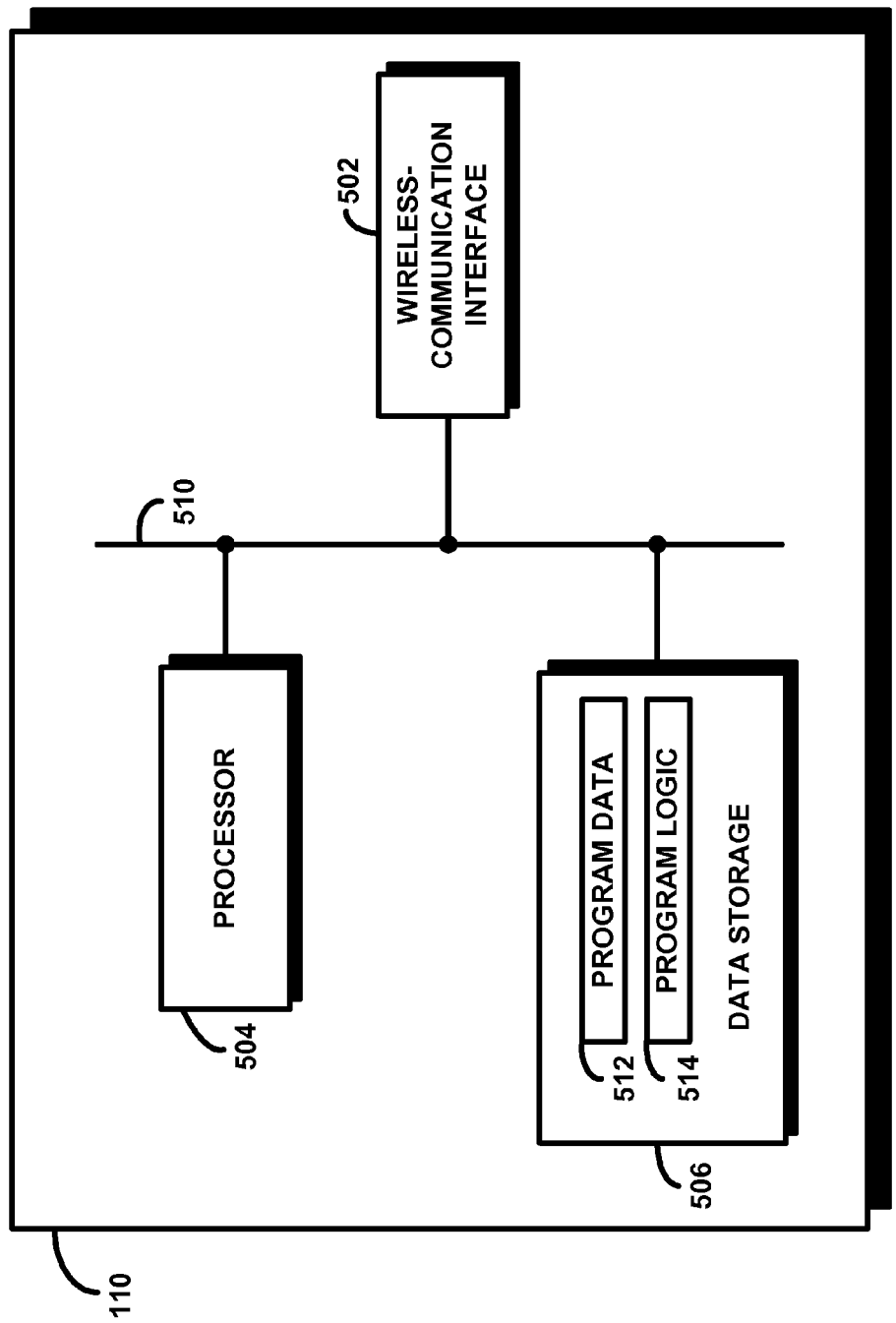
FIG. 5 depicts a simplified block diagram of a base station configured to implement aspects of some embodiments.

FIG. 5 is a simplified block diagram showing functional components of an example base station 110 that is configured to carry out functions of embodiments of the described technology. Base station 110 may take the form of any network entity capable of carrying out features of such embodiments. As shown in FIG. 5, base station 110 may include wireless-communication interface 502, processor 504, and data storage 506. Base station 110 may include other components as well.

Referring to FIG. 5, wireless-communication interface 502 may be configured to communicatively couple base station 110 to various other entities. As one example, wireless-communication interface 502 may be configured to communicatively couple base station 110 to one or more network nodes, such as sensor nodes in a sensor network. As another example, wireless-communication interface 502 may be configured to communicatively couple base station 110 to other network entities, perhaps in other communication networks. To facilitate these couplings, communication interface 502 may take various forms. For example, wireless-communication interface 502 may take the form of one or more antennas adapted to facilitate wireless communication according to a desired protocol, and/or any other interface that provides for wireless communication with an entity. Wireless-communication interface 502 may also include some combination of different interface types. Other configurations are possible as well.

Processor 504 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 506, in turn, may comprise one or more physical and/or non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 504. Further some data storage mediums may be external to and/or removable from base station 110 and may interface with base station 110 in various manners. As shown, data storage 506 may contain (i) program data 512 and (ii) program logic 514, which may be maintained either separately or together within data storage 506.

Program data 512 may contain information relating to wireless links of base station 110, network-node data of the network nodes in sensor network 100, or other data representing information related to carrying out the polling method disclosed herein. Program logic 514 may comprise machine-language instructions that may be executed or interpreted by processor 504 to carry out functions in according with the embodiments of the polling method disclosed herein. For example, program logic 514 may be executable by processor 504 to assign, to at least one network node in a set of network nodes, a respective polling interval based at least in part on a respective cost contribution of the at least one network node; and during a timeslot selected according to the respective polling interval, (a) poll the at least one network node and (b) as a result of the polling, receive from the at least one network node one or more of network-node data and environment data. As another example, program logic 514 may be executable by processor 504 to, prior to the assigning, determine the cost contribution of the at least one network node based on one or more of an energy-consumption metric associated with the at least one network node and a latency metric associated with the at least one network node. Program logic 514 may be executable by processor 504 to carry out various other functions as well.

IV. Conclusion

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    assigning, to at least one network node in a set of network nodes, a respective polling interval based at least in part on a respective cost contribution of the at least one network node;
    during a timeslot selected according to the respective polling interval, (a) polling the at least one network node and (b) as a result of the polling, receiving from the at least one network node one or more of network-node data and environment data wherein the assigning further comprises assigning a first network node a first polling interval and assigning a second network node a second polling interval;
    after the assigning, detecting that a same first time slot has been selected for both the first network node and the second network node;
    responsive to the detecting, selecting one of the first network node and the second network node based on a comparison between a priority metric of the first network node and a priority metric of the second network node; and
    polling the selected network node during the particular time slot.

2. The method of claim 1, further comprising:
    prior to the assigning, determining the cost contribution of the at least one network node based on one or more of an energy-consumption metric associated with the at least one network node and a latency metric associated with the at least one network node.

3. The method of claim 1, further comprising:
    prior to the assigning, determining the cost contribution of the at least one network node based on an energy-consumption metric associated with the at least one network node and a latency metric associated with the at least one network node, wherein the latency metric and the respective energy-consumption metric are relatively weighted according to an energy-latency factor.

4. The method of claim 1, wherein the network-node data comprises one or more of measurement frequency, measurement size, buffer size, relative rank, remaining buffer space, and remaining energy.

5. The method of claim 1, wherein the environment data comprises one or more of a measurement of an environment condition and an environment indicator function.

6. The method of claim 1, wherein the priority metric is one of an environment indicator function, remaining buffer space, remaining energy, or relative rank.

7. The method of claim 1, the method further comprising:
    during a second time slot after the first timeslot, polling the unselected one of the first network node and the second network node.

8. The method of claim 1, wherein the at least one network node of the set of network nodes is a cluster-head node, and wherein the receiving comprises receiving one or more of network-node data associated with a network node that is not the cluster-head node and environment data measured by a network node that is not the cluster-head node.

9. The method of claim 1, wherein the at least one network node in the set of network nodes is at least one sensor in a set of sensors.

10. The method of claim 9, wherein the cost contribution of the at least one sensor is based on one or more of an energy-consumption metric associated with the at least one sensor and a latency metric associated with the at least one sensor.

11. The method of claim 10, wherein the energy-consumption metric comprises a ratio of (i) a product of a power consumption of a sensor radio of the at least one sensor and a number of overhead bits transmitted by the at least one sensor, and (ii) a product of a data rate of transmission of the at least one sensor and a polling interval of the at least one sensor.

12. The method of claim 10, wherein the latency metric comprises an average latency.

13. The method of claim 10, wherein the assigning, to the at least one sensor in the set of sensors, the respective polling interval based at least in part on the respective cost contribution of the at least one sensor is further based on both (i) the respective cost contribution of the at least one sensor and (ii) a weighted-average summation of (a) an energy-consumption metric associated with each sensor in the set of sensors and (b) a latency metric associated with each sensor in the set of sensors.

14. The method of claim 13, wherein the assigning based on both (i) the respective cost contribution of the at least one sensor and (ii) a weighted-average summation of (a) an energy-consumption metric associated with each sensor in the set of sensors and (b) a latency metric associated with each sensor in the set of sensors is further based on an optimization of a respective polling interval assigned to each sensor, and wherein the respective polling interval assigned to each sensor is assigned so as to not exceed, for each sensor, (i) each of (a) a recommended update interval, (b) a buffer-fill constraint, and (c) an overhead constraint, and (ii) a timeslot-duration constraint.

15. The method of claim 13, wherein the assigning based on both (i) the respective cost contribution of the at least one sensor and (ii) a weighted-average summation of (a) an energy-consumption metric associated with each sensor in the set of sensors and (b) a latency metric associated with each sensor in the set of sensors is further based on a maximum polling interval determined according to at least one of (i) a physician requirement, (ii) a hardware parameter of the at least one sensor, and (ii) an amount of data generated by the at least one sensor.

16. A base station comprising:
a wireless-communication interface;
a processor;
data storage; and
program instructions stored in the data storage and executable by the processor to:
 assign, to at least one network node in a set of network nodes, a respective polling interval based at least in part on a respective cost contribution of the at least one network node;
 during a timeslot selected according to the respective polling interval, (a) poll the at least one network node and (b) as a result of the polling, receive from the at least one network node one or more of network-node data and environment data wherein the assigning further comprises assigning a first network node a first polling interval and assigning a second network node a second polling interval;
 after the assigning, detecting that a same first time slot has been selected for both the first network node and the second network node;
 responsive to the detecting, selecting one of the first network node and the second network node based on a comparison between a priority metric of the first network node and a priority metric of the second network node; and
 polling the selected network node during the particular time slot.

17. The base station of claim 16, wherein the program instructions further comprise instructions to:
 prior to the assigning, determine the cost contribution of the at least one network node based on one or more of an energy-consumption metric associated with the at least one network node and a latency metric associated with the at least one network node.

18. The base station of claim 16, wherein the program instructions further comprise instructions to:
 during a second time slot after the first timeslot, poll the unselected one of the first network node and the second network node.

19. A physical computer-readable medium having computer executable instructions stored thereon, the instructions comprising:
 instructions for assigning, to at least one network node in a set of network nodes, a respective polling interval based at least in part on a respective cost contribution of the at least one network node;
 instructions for, during a timeslot selected according to the respective polling interval, (a) polling the at least one network node and (b) as a result of the polling, receiving from the at least one network node one or more of network-node data and environment data wherein the assigning further comprises assigning a first network node a first polling interval and assigning a second network node a second polling interval;
 after the assigning, detecting that a same first time slot has been selected for both the first network node and the second network node;
 responsive to the detecting, selecting one of the first network node and the second network node based on a comparison between a priority metric of the first network node and a priority metric of the second network node; and
 polling the selected network node during the particular time slot.

\* \* \* \* \*